(12) United States Patent
Appelman

(10) Patent No.: US 7,543,018 B2
(45) Date of Patent: Jun. 2, 2009

(54) CACHING SIGNATURES

(75) Inventor: Barry Appelman, McLean, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 728 days.

(21) Appl. No.: 09/873,272

(22) Filed: Jun. 5, 2001

(65) Prior Publication Data
US 2002/0184333 A1    Dec. 5, 2002

Related U.S. Application Data

(63) Continuation-in-part of application No. 09/371,208, filed on Aug. 10, 1999, now Pat. No. 6,385,656, which is a continuation of application No. 08/630,846, filed on Apr. 11, 1996, now Pat. No. 6,112,250.

(51) Int. Cl.
G06F 15/16    (2006.01)
G06F 7/00    (2006.01)
G06F 17/30    (2006.01)

(52) U.S. Cl. .................... 709/203; 709/217; 709/247; 707/1

(58) Field of Classification Search ......... 709/217–219, 709/202–203, 238–244, 201, 246–247; 705/26, 705/51, 75; 713/176, 178, 180; 707/1–10, 707/101, 104.1, 203
See application file for complete search history.

(56) References Cited

U.S. PATENT DOCUMENTS

| | | | |
|---|---|---|---|
| 4,125,873 A | 11/1978 | Chesarek | |
| 4,206,315 A | 6/1980 | Matyas et al. | |
| 4,271,476 A | 6/1981 | Lotspiech | |
| 5,087,913 A | 2/1992 | Eastman | |
| 5,131,016 A | 7/1992 | Broughton et al. | 375/122 |
| 5,182,762 A | 1/1993 | Shirai et al. | |
| 5,276,898 A | 1/1994 | Kiel et al. | 395/800 |
| 5,287,420 A | 2/1994 | Barrett | |
| 5,392,036 A | 2/1995 | Klein | |
| 5,410,671 A | 4/1995 | Elgamal et al. | 395/425 |
| 5,465,299 A * | 11/1995 | Matsumoto et al. | 713/176 |
| 5,500,928 A | 3/1996 | Cook et al. | |
| 5,506,580 A | 4/1996 | Whiting et al. | 341/51 |
| 5,539,908 A | 7/1996 | Chen et al. | |
| 5,557,749 A | 9/1996 | Norris | 395/200 |
| 5,563,649 A | 10/1996 | Gould et al. | |
| 5,574,906 A | 11/1996 | Morris | 395/601 |
| 5,581,366 A | 12/1996 | Merchant et al. | 358/400 |
| 5,590,317 A | 12/1996 | Iguchi et al. | |

(Continued)

OTHER PUBLICATIONS

Appelman, Recompression Server, Oct. 16, 1997, WIPO, WO 97/38434.*

(Continued)

*Primary Examiner*—Saleh Najjar
*Assistant Examiner*—Asad M Nawaz
(74) *Attorney, Agent, or Firm*—Fish & Richardson P.C.

(57) ABSTRACT

The performance of a network system having one or more requester nodes, one or more provider nodes, and one or more intermediate nodes is improved by determining the digital signature of a received file, looking up the digital signature in an index of signatures, and forwarding a previously compressed version of the requested file when the digital signature is found in the index of signatures.

36 Claims, 5 Drawing Sheets

U.S. PATENT DOCUMENTS

| | | | |
|---|---|---|---|
| 5,649,151 A | 7/1997 | Chu et al. | |
| 5,757,965 A | 5/1998 | Ohki | 382/232 |
| 5,765,173 A * | 6/1998 | Cane et al. | 707/204 |
| 5,805,735 A | 9/1998 | Chen et al. | |
| 5,805,827 A | 9/1998 | Chau et al. | |
| 5,829,051 A * | 10/1998 | Steely et al. | 711/216 |
| 5,838,967 A | 11/1998 | Okayama et al. | |
| 5,862,347 A | 1/1999 | Suzuki | 395/200.77 |
| 5,907,619 A * | 5/1999 | Davis | 713/176 |
| 6,018,774 A | 1/2000 | Mayle et al. | |
| 6,058,428 A | 5/2000 | Wang et al. | |
| 6,076,111 A * | 6/2000 | Chiu et al. | 709/232 |
| 6,085,249 A | 7/2000 | Wang et al. | |
| 6,097,389 A | 8/2000 | Morris et al. | |
| 6,202,061 B1 | 3/2001 | Khosla et al. | |
| 6,223,211 B1 | 4/2001 | Hamilton et al. | |
| 6,353,848 B1 | 3/2002 | Morris | |
| 6,357,004 B1 * | 3/2002 | Davis | 713/100 |
| 6,449,658 B1 * | 9/2002 | Lafe et al. | 709/247 |
| 6,513,050 B1 * | 1/2003 | Williams et al. | 707/202 |
| 6,516,337 B1 * | 2/2003 | Tripp et al. | 709/202 |
| 6,523,115 B1 | 2/2003 | Ono et al. | |
| 6,601,172 B1 * | 7/2003 | Epstein | 713/178 |
| 6,604,106 B1 * | 8/2003 | Bodin et al. | 707/101 |
| 6,611,812 B2 * | 8/2003 | Hurtado et al. | 705/26 |
| 6,615,275 B2 * | 9/2003 | Yohe et al. | 709/247 |
| 6,629,150 B1 * | 9/2003 | Huded | 709/247 |
| 6,785,815 B1 * | 8/2004 | Serret-Avila et al. | 713/176 |
| 6,976,053 B1 * | 12/2005 | Tripp et al. | 709/202 |
| 6,990,526 B1 * | 1/2006 | Zhu | 709/227 |
| 7,096,493 B1 * | 8/2006 | Liu | 726/8 |
| 7,171,469 B2 * | 1/2007 | Ackaouy et al. | 709/225 |
| 7,386,531 B2 * | 6/2008 | Kiessig et al. | 707/1 |
| 7,386,532 B2 * | 6/2008 | Kiessig et al. | 707/1 |
| 2002/0099938 A1 | 7/2002 | Spitz | |
| 2002/0116508 A1 | 8/2002 | Khan et al. | |
| 2002/0124170 A1 | 9/2002 | Johnson, Jr. | |
| 2003/0056100 A1 | 3/2003 | Beatson | |
| 2003/0065134 A1 * | 4/2003 | Sakanoue et al. | 528/422 |
| 2004/0039912 A1 | 2/2004 | Borrowman et al. | |
| 2004/0139327 A1 | 7/2004 | Brown et al. | |
| 2004/0255120 A1 | 12/2004 | Botti et al. | |
| 2005/0015466 A1 * | 1/2005 | Tripp | 709/219 |
| 2007/0192444 A1 * | 8/2007 | Ackaouy et al. | 709/219 |

OTHER PUBLICATIONS

Office Action from copending U.S. Appl. No. 10/157,955, dated Feb. 15, 2005.

Office Action from copending U.S. Appl. No. 10/061,270, dated Feb. 10, 2005.

Office Action from the Canadian Patent Office, Application No. 2,252,045, dated Feb. 8, 2005.

Takagi, H., "Effective Use of Proxy Servers for Smoother WWW Access", Domestic Technology Journal, Internet Magazine, Mar. 1996, (17 pages, including certification of translation).

Ofuchi, M., et al., "A Study of Information Distribution Mechanisms in Wide-Area Network Environments", SIG Notes, vol. 96, No. 12, Jan. 25-26, 1996, (12 pages, including certification of translation).

* cited by examiner

CACHING SIGNATURES

This application claims priority from U.S. patent application Ser. No. 08/630,846, filed Apr. 11, 1996, which is incorporated by reference. This application is a continuation-in-part of U.S. patent application Ser. No. 09/371,208, filed Aug. 10, 1999 now U.S. Pat. No 6,385,656, which is a continuation of U.S. patent application Ser. No. 08/630,846, filed Apr. 11, 1996 now U.S. Pat. No. 6,112,250.

TECHNICAL FIELD

This invention generally relates to a computer network system, and more particularly to managing compressed data files.

BACKGROUND

A wide area public computer network system may include a client computer connected to a server computer through a network and one or more "proxy" servers. To improve performance in such a network system, frequently requested files may be stored in a cache, for example, so that the same files are not repeatedly retrieved and/or transmitted across the entire expanse of a network.

SUMMARY

In one general aspect, the performance of a network system having one or more requestor nodes, one or more provider nodes, and one or more intermediate nodes is improved by determining the digital signature of a received file, looking up the digital signature in an index of signatures, and forwarding a previously compressed version of the requested file when the digital signature is found in the index of signatures.

Determining the digital signature may include applying a hashing technique to the requested file. Applying the hashing technique may include applying a proprietary algorithm, the MD5 algorithm, the SHA algorithm, and/or some other hashing technique. Applying the hashing technique may include using a key to decrypt an attached signature. The requested file may include an image file, an HTML file, a video file, an audio file, an email message, and/or an e-mail attachment. The digital signature and/or the index of signatures may be received from provider nodes and/or intermediate nodes.

Implementations may include compressing the requested file if the file's digital signature is not found in the index of signatures and adding the file's digital signature to the index of signatures. The compressed file may be stored locally and/or sent to the requestor node. Implementations also may include calculating whether providing the file directly to the requestor node is faster than determining the file's signature and compressing the file, and may include providing the file directly when it is faster to do so.

The techniques may be implemented by an apparatus and/ or by a computer program stored on a computer readable medium. The apparatus may include an intermediate node, a provider node, a web proxy server, an IP tunnel, and/or a caching server. The computer readable medium may include a disc, a client device, a host device and/or a propagated signal.

The described techniques make efficient use of limited cache storage space, which may diminish rapidly when numerous copies of the same file are stored. Use of the digital signatures in the manner described avoids problems associated with identical data that can be retrieved from countless sources and referenced in many different ways. For example, files that contain the same core data may be identified by different file names when each file is retrieved from a different source. Thus, use of digital signatures avoids problems associated with having redundant data consume valuable storage space in a cache.

Other features and advantages will be apparent from the following description, including the drawings, and from the claims.

DETAILED DESCRIPTION

Figure 1:
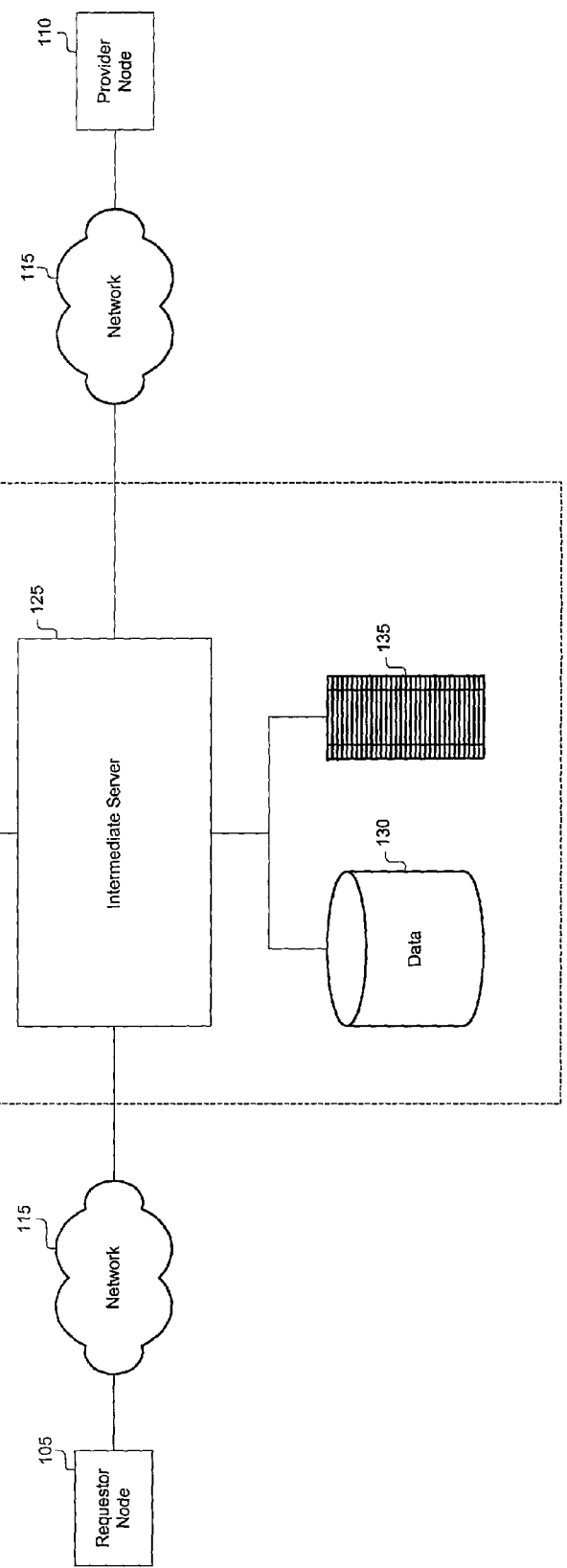
FIG. 1 is a block diagram of a computer network system.

For illustrative purposes, FIG. 1 depicts a computer network system 100 that implements techniques for managing compressed data files. For brevity, several elements in the figure are represented as monolithic entities. However, these elements each may include numerous interconnected computers and components designed to perform a set of specified operations and/or dedicated to a particular geographical region.

As shown in FIG. 1, the computer network system 100 includes a requestor node 105 connected to a provider node 110 through one or more networks 115 and one or more intermediate nodes 120. In one implementation, the requestor node 105 is configured to send one or more file requests to a provider node 110 through the network 115. The provider node 110 is configured to receive and satisfy file requests by sending requested files to the requestor node 105 through the network 115. The requestor node 105 may communicate directly with the intermediate node 120, or the requestor node 105 may communicate directly with the provider node 110. If the requestor node 105 is attempting to communicate directly with the provider node 110, the intermediate node 120 may act transparently as an intermediary between the requestor node 105 and the provider node 110.

One example of a requestor node 105 is a general-purpose computer (e.g., a personal computer) capable of responding to and executing instructions in a defined manner. Other examples include a workstation, a device (e.g., a wireless phone or a personal digital assistant), a component, other equipment, or some combination of these items that is capable of responding to and executing instructions. The requestor node 105 also may include one or more of such computers and/or devices.

The requestor node 105 may receive instructions from a software application, a program, a piece of code, a device, a computer, a computer system, or a combination of these elements that independently or collectively directs operations of the node. The instructions may be embodied permanently or temporarily in any type of machine, component, equipment, storage medium, or propagated signal that is capable of being delivered to the requestor node 105.

In one implementation, the requestor node 105 includes one or more information retrieval software applications (e.g., browser application, e-mail application, instant messaging client, online service provider client, interactive television client, or ISP client) for transmitting requests to the provider node 110. The information retrieval applications may run on a general purpose operating system and a hardware platform that includes a general purpose processor and specialized hardware for graphics, communications and/or other capabilities. Another implementation may include a wireless phone running a micro browser application on a reduced operating system with both general purpose and specialized hardware to operate in mobile environments.

One example of a provider node 110 is a general-purpose computer (e.g., a server) capable of responding to and executing instructions in a defined manner. Other examples include a personal computer, a special-purpose computer, a workstation, a device, a component, other equipment or some combination thereof capable of responding to and executing instructions. The provider node 110 may include and/or form part of an information delivery network, such as, for example the Internet, the World Wide Web, an online service provider, and/or any other analog or digital wired and/or wireless network that provides information. Such information delivery networks may support a variety of online services including Internet and/or web access, e-mail, instant messaging, paging, chat, interest groups, audio and/or video streaming, and/or directory services.

The provider node 110 may receive instructions from a software application, a program, a piece of code, a device, a computer, a computer system, or a combination thereof that independently or collectively directs operations of the node. The instructions may be embodied permanently or temporarily in any type of machine, component, equipment, storage medium, or propagated signal that is capable of being delivered to the provider node 110.

In one implementation, the provider node 110 includes one or more information-providing software applications for accessing and transmitting requested files to the requestor node 105. The information-providing applications may run on a general purpose operating system and a hardware platform that includes a general purpose processor and/or specialized hardware. Another implementation may include a reduced operating system with both general purpose and specialized hardware to operate in mobile environments.

One example of an intermediate node 120 is a general-purpose computer (e.g., a server) capable of responding to and executing instructions in a defined manner. Other examples include a workstation, a device, a component, other equipment, or some combination thereof capable of responding to and executing instructions. The intermediate node 120 may include and/or form part of an information delivery network, such as, for example the Internet, the World Wide Web, an online service provider, and/or any other analog or digital wired and/or wireless network that provides information. Such information delivery networks may support a variety of online services including Internet and/or web access, e-mail, instant messaging, paging, chat, interest groups, audio and/or video streaming, and/or directory services.

The intermediate node 120 may receive instructions from a software application, a program, a piece of code, a device, a computer, a computer system, or a combination thereof that independently or collectively directs operations of the node. The instructions may be embodied permanently or temporarily in any type of machine, component, equipment, storage medium, or propagated signal that is capable of being delivered to the intermediate node 120.

In one implementation, the intermediate node 120 includes one or more congestion-reducing software applications for managing requested files. The congestion-reducing applications may examine retrieved files and/or file requests to determine whether a requested file has been stored locally on the intermediate node 120. The congestion-reducing applications may run on a general purpose operating system and a hardware platform that includes a general purpose processor and/or specialized hardware. Another implementation may include a reduced operating system with both general purpose and specialized hardware to operate in mobile environments.

The intermediate node 120 includes an intermediate server 125 connected to and communicating with a cache 130, a digital signature storage medium 135, and a data compressor 140. While FIG. 1 illustrates each of the cache 130, the digital signature storage medium 135, the intermediate server 125, and the data compressor 140 as a separate and distinct element within the intermediate node 120, other implementations are possible. Indeed, the functions associated with an element in the intermediate node 120 may be performed by any one or more elements of the intermediate node 120 and, in some cases, may be performed by the requester node 105 and/or the provider node 110.

In one implementation, the intermediate server 125 is configured to receive a file from a provider node 110 and to determine the digital signature of the received file. The cache 130 is configured to store files received from the provider node 110. The cache 130 may store compressed or uncompressed versions of a file. The intermediate node 120 further includes a digital signature storage area 135 configured to maintain an index of digital signatures. The storage area 135 is searchable by the intermediate server 125 and associates files stored in the cache 130 with entries in the index of digital signatures. The intermediate server 125 also is connected to a data compressor 140 that is configured to compress files for improved efficiency. The compressor 140 can include hardware such as a programmed dedicated processor, or may be implemented as software routines executed on the general processor(s) of the intermediate server 125.

The intermediate node 120 may include one or more pieces of networking infrastructure (e.g., servers, processors, routers, switches) programmed to maximize network performance. For example, the intermediate node 120 may include an IP tunnel for converting data between protocols (e.g., an OSP protocol and standard Internet protocol) for data transmission between different communications systems. An IP tunnel also may act as a buffer between requestor nodes and provider nodes by implementing content filtering and time saving techniques. In one implementation, the intermediate node 120 is configured to store frequently accessed information in the cache 130 and to provide the stored information to the requestor node 105 locally from the cache 130. In this way, the intermediate node 120 avoids the need to access the Internet in response to a request from the requestor node 105.

In another example, the intermediate node 120 includes a web proxy server configured to look up subscriber information from the IP address of the requestor node 105 to determine control settings (e.g., filtering lever) and other demographic information (e.g., location, device types) associated with the subscriber. In this way, the intermediate node 120 can tailor the subscribers content and user interfaces. Again, the cache 130 may store certain URLs ("Uniform Resource Locators") and other electronic content so that the intermediate node 120 can locally deliver information to the requestor node 105.

The networks 115 connecting the requestor node 105, the provider node 110, and/or the intermediate node 120 may include one or more wired and/or wireless communication links. Examples of such communication links include, but are not limited to, a dial-up modem connection, a cable modem connection, a DSL line, a WAN connection, a LAN connection (e.g., Ethernet, Fast Ethernet, Gigabit Ethernet, Token Ring, ATM), a transceiver connection, a wireless mobile telephone connection, and/or a satellite link.

Figure 2:
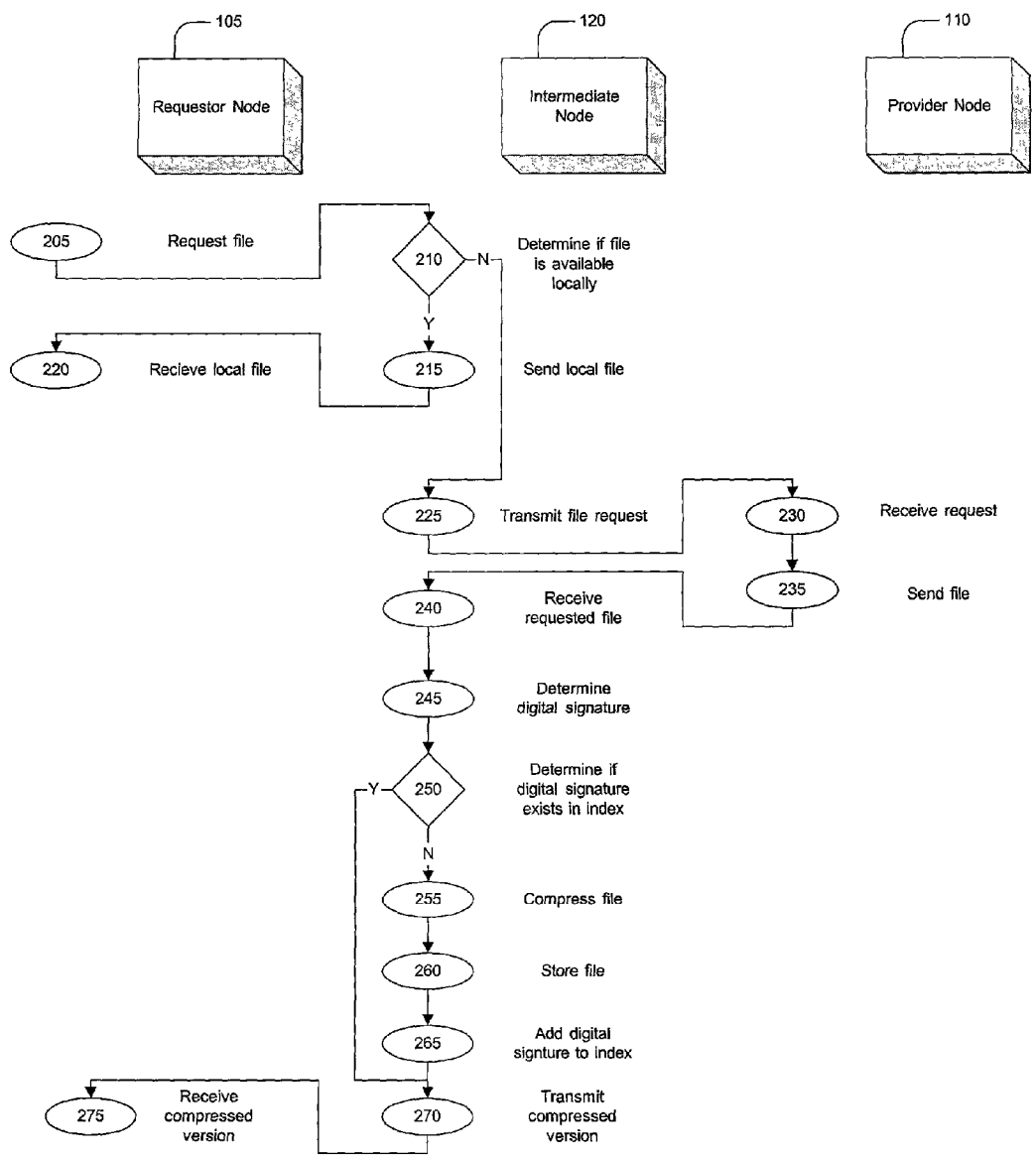
FIGS. 2-5 are flow charts of methods implemented by the computer network system of FIG. 1.

Referring also to FIG. 2, the computer network system 100 operates according to a procedure 200. Initially, the requestor node 105 requests a file (step 205). In one implementation, the file request includes a URL identifying a particular provider node 110 and/or data file. The intermediate node 120 receives the file request from the requester node 105 and then checks whether the file request can be satisfied by one or more data files stored locally in the cache 130 (step 210).

If the requested file is available locally, the local file is sent (step 215) and received by the requester node (step 220). In one implementation, numerous identical requests from one or more requestor nodes 105 cause the intermediate node 120 to locally store data responsive to the request. Subsequent identical requests are satisfied using the data residing on the intermediate node 120 without contacting the provider node 110. For example, content residing at a frequently requested URL may be stored in the cache 222 of the intermediate node 120 when the number of requests for the popular URL exceeds a threshold value. Once the responsive data is stored locally, the intermediate node 120 can retrieve the requested content and transmit that content to the requestor node 105 without having to access the servers residing at the URL. This greatly reduces delay experienced by the requestor node 105.

If the request from the requestor node cannot be satisfied locally, the intermediate node 110 transmits the file request to the provider node 110 (step 225). Upon receiving the file request (step 230), the provider node 110 identifies and retrieves the data file responsive to the request. The retrieved file may include any type of data including, but not limited to, text data, image data, audio data, video data, HTML or other markup language, and/or data associated with an Internet site, Web page, electronic message or attachment. The provider node 110 then sends the requested file to the intermediate node 120 (step 235). The intermediate node 120 receives the retrieved file from the provider node 110 (step 240) and determines a digital signature for the retrieved file (step 245).

Determining the signature may be accomplished in different ways. For example, the intermediate node 120 may determine the digital signature by applying a hashing technique to at least a portion of the requested data file. The output of the hashing techniques is referred to as a hash value. The hash value is substantially smaller than the requested digital file, and is generated from an algorithm in such a way that it is extremely unlikely that different data files will produce the same hash value. One example of a hashing technique is a proprietary hashing algorithm used by an OSP. Other examples of hashing techniques include, but are not limited to, the MD5 family of algorithms and/or the SHA family of algorithms.

Figure 3:
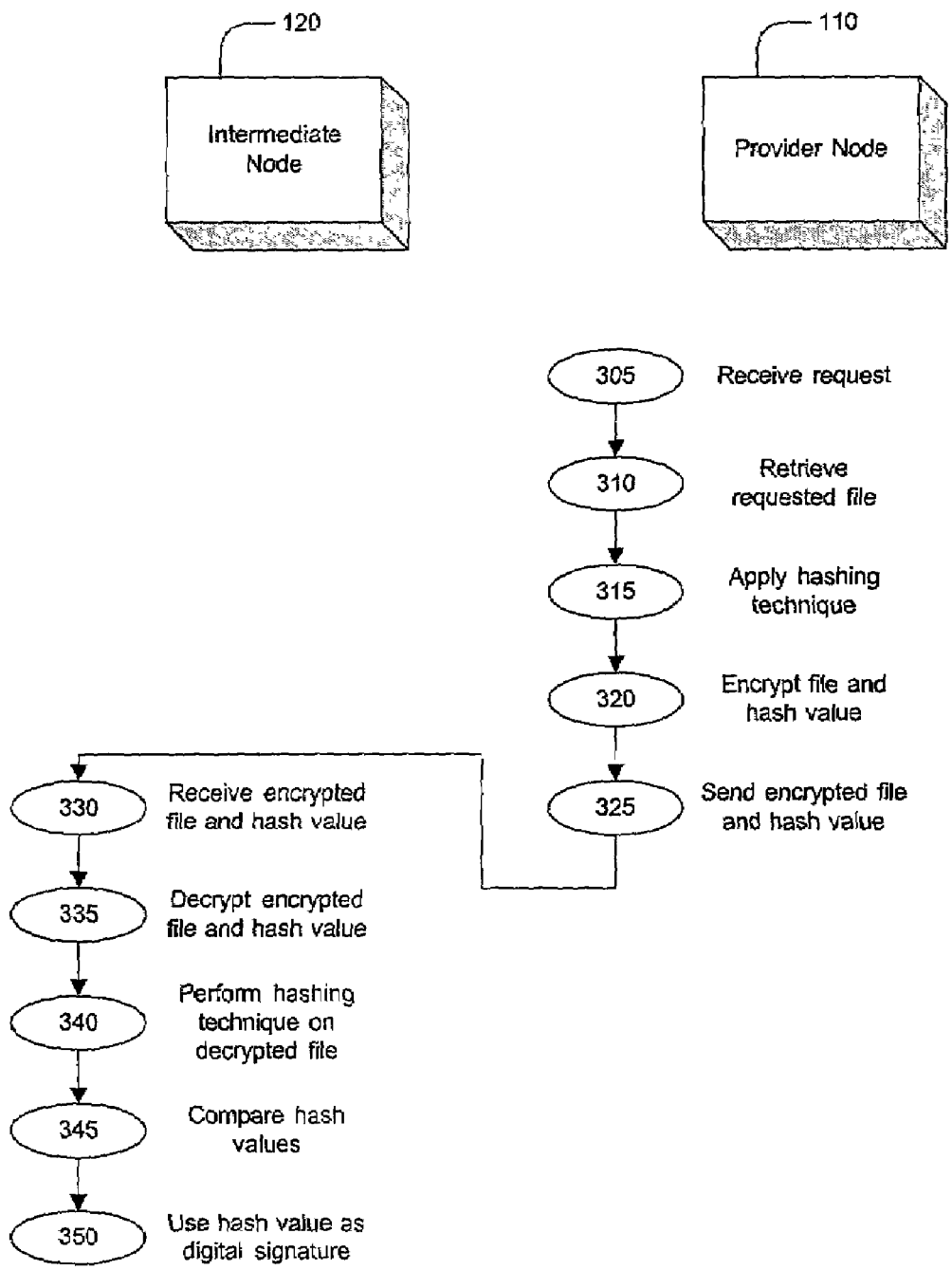

Referring now to FIG. 3, the intermediate node 110 also may determine the digital signature by decrypting an encrypted digital signature received from the provider node 110. In one implementation, the provider node 110 receives a file request (step 305), retrieves the requested file (step 310), and then applies a hashing technique to the requested data file. Next, the data file and the obtained hash value are encrypted (step 320) and then sent to the intermediate node 105 (step 325). Upon receiving the encrypted data from the provider node 110 (step 330), the intermediate node 120 decrypts the data file and the hash value using an appropriate key (step 335). In order to verify the integrity of the data file, the intermediate node 120 may perform the same hashing technique applied by the provider node 110 (step 340) and compare the resulting hash value to the decrypted hash value (step 345). If the hash vales are the same, the integrity of the data was preserved across the network 115 and the hash value may be used as the digital signature (step 350).

In another implementation, the provider node 110 transmits a batch of frequently requested files to the intermediate node 120 for local storage along with corresponding digital signatures for each file. The provider node 110 may send the frequently requested files proactively or may send a dynamic reference (e.g., link) for accessing a version of the file stored closer to the intermediate node.

Figure 4:
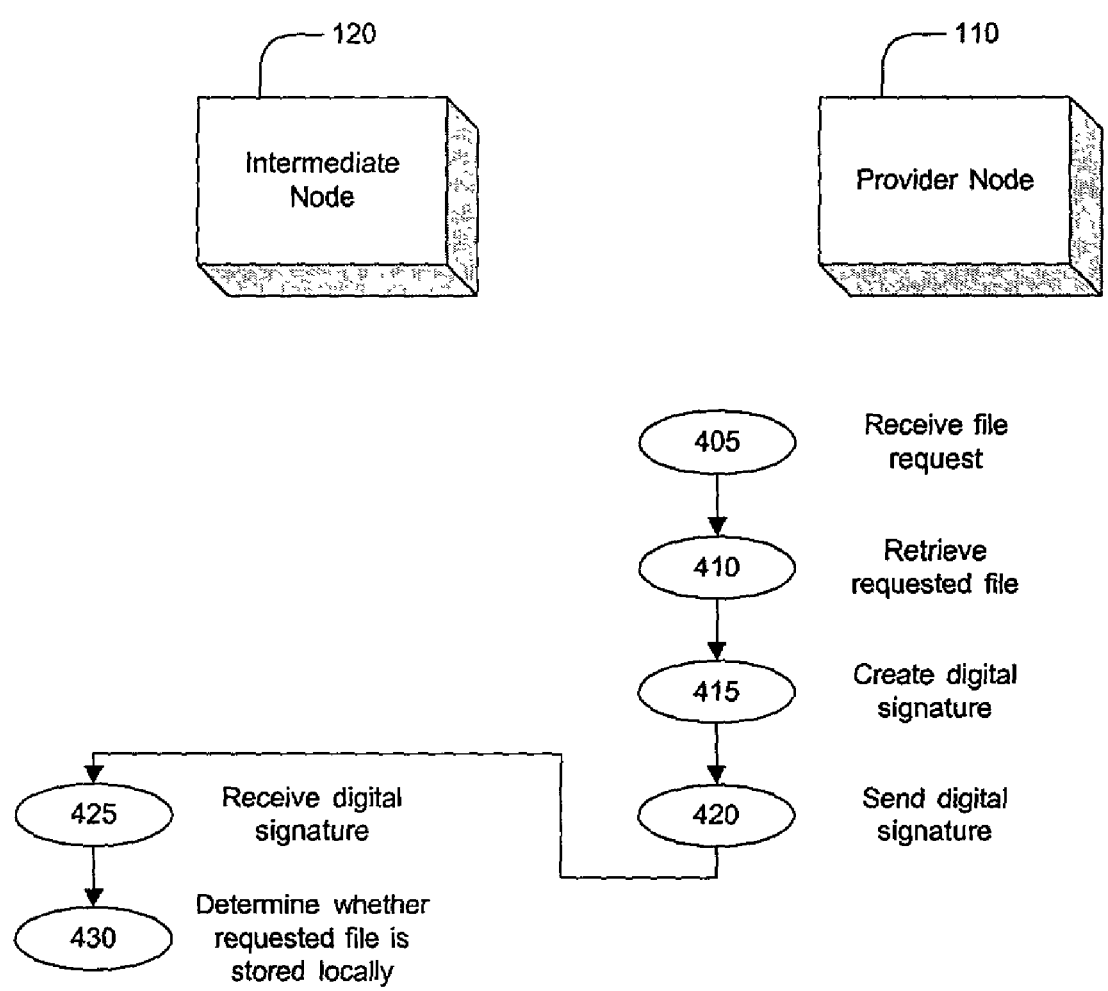

Referring to FIG. 4, in yet another implementation, the provider node 110 receives a file request (step 405), retrieves the requested file (step 410), and creates a digital signature for the requested file (step 415). Next, the provider node 110 sends only the digital signature for the requested file to the intermediate node 120 (step 420). The intermediate node 130 receives the digital signature of the requested file (step 425) and then uses the transmitted signature to determine whether the file is already stored in the cache 130 (step 430). Typically, the file will be referenced under a different name such that the intermediate node 120 did not previously identify the file as being available locally. The intermediate node 120 requests the actual file only if the signature is not included in the index of signatures.

Referring again to FIG. 2, once the digital signature is determined (step 245), the intermediate node 120 looks up the digital signature in an index of signatures (step 250). In one implementation, the index of signatures is stored within the intermediate node 120 in a digital signature storage area 135. The index of signatures, however, may be stored in a separate hardware device. The digital signature storage area 135 may include any type of device and/or storage medium (e.g., memory, disc, propagated signal) having volatile or nonvolatile storage capacity.

The index of signatures is associated with previously-compressed files stored in the intermediate node 120. In one implementation, the index includes a comprehensive list of all compressed files stored in the cache 130 of the intermediate node 120. The index of signatures may include pointers (e.g., links) to the compressed files stored in the cache 130. The digital signatures may be listed or ranked by popularity, numerically, historically, or in any other way that facilitates searching. The index of signatures may be compiled by the intermediate node, as discussed in more detail below, and/or imported from neighboring devices, such as, for example, other intermediate nodes 120 and/or provider nodes 110. An imported index of signatures may be merged with an existing index of signatures to form a composite index of signatures. Duplicate entries may be eliminated from the composite index of signatures.

If the digital signature is not found in the index of signatures, the intermediate node 120 may compress the requested file (step 255), store the compressed file in the cache 130 (step 260), and then add the digital signature in the index of signatures 135 (step 265).

Compressing the retrieved file may be accomplished in a variety of ways and may include decompressing precompressed files (such as .JPEG, and .TIF) and recompressing the files into more efficient formats. The compressed versions of frequently requested files may be stored in the cache 130 to provide faster response to a requestor node 105. Any caching algorithm may be used, such as a conventional "least recently used" (LRU) algorithm, to manage file storage in the cache 130. The intermediate node 120 may maintain a log of file requests and select files to be cached based upon logged request frequencies. Caching may be done on-line, while compressing files, or off-line using logged request frequencies to retrieve popular files and compress the files during idle time for the intermediate node 120.

In some cases, it may be advantageous to store more than one copy of a compressed file on the intermediate node 110. For example, a number of copies according to a predetermined ratio of stored copies to users may be stored to accomplish load balancing. In one implementation, the intermediate node 120 includes a counter (not shown) to keep track of the number of times a file is retrieved. At high frequencies, the intermediate node 120 may store multiple instances of the compressed file to handle the volume of requests. When the frequency diminishes, instances of the file may be removed.

Some implementations may better manage high demand conditions by storing multiple instances of the index of digital signatures 135, and/or including multiple intermediate nodes 120. In high demand conditions, the multiple stored files, multiple indexes of digital signatures 135, and/or multiple intermediate nodes 120 are allocated (e.g., round robin assigned) to users. For example, when multiple versions of a compressed file are stored, the intermediate node 120 will alternate among which instance is transmitted.

Other implementations may initially add a digital signature to the index of signatures 135 but will only store the compressed version of the retrieved file if the digital signature is found in the index of signatures a threshold number of times. For example, the intermediate node 120 may store a retrieved web file only when the retrieved web file has been requested at least five hundred times in a one hour period.

Another implementation may include keeping a time stamp with the digital signature. For example, when a digital signature is added to the index of signatures 135, the time stamp will indicate when the digital signature was added. The time stamp may be used to keep the index of signatures 135 current, and subsequent matches to the digital signature may update the time stamp. The time stamp also may be used to remove digital signatures corresponding to files that have not been frequently and/or recently requested.

Figure 5:
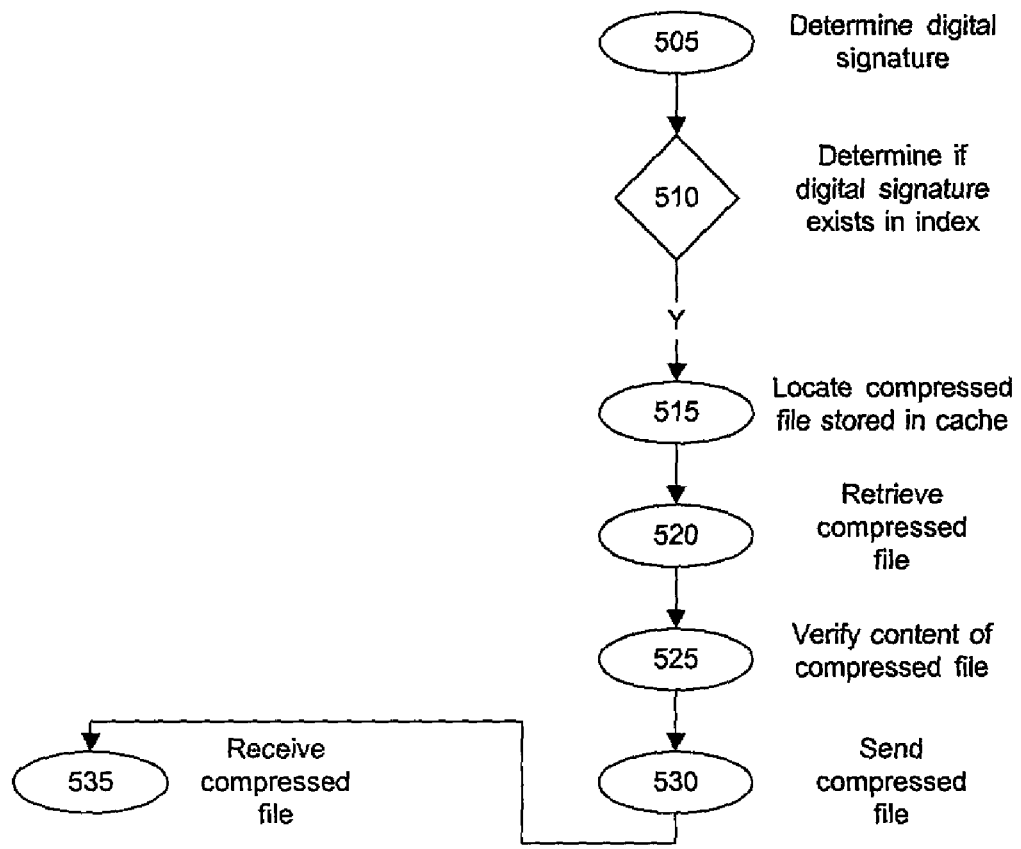

If the digital signature is found in the index of signatures 135, a compressed version of the file is retrieved, transmitted to the requestor node 105 (step 270), and finally received by the requester node 105 (step 275). In one implementation, shown in FIG. 5, the intermediate server 125 determines the digital signature of a requested file (step 505) and determining whether the digital signature exists in the index of signatures 135 (step 510). If the digital signature exists in the index, the intermediate node 120 locates the compressed file associated with the digital signature that is stored in the cache 130 (step 515). The digital signature in the index may be linked and/or otherwise referred to the associated compressed file. The intermediate server 125 retrieves the compressed file from the cache 130 (step 520) and forwards the compressed file to the requestor node 105 (step 530). The requestor node 105 receives the compressed file (step 535) and then delivers the compressed version or an uncompressed version to the user.

To ensure that a retrieved file corresponds to the digital signature, the intermediate node 120 may verify the content of the retrieved compressed file (step 525). In one implementation, this step is performed prior to forwarding the compressed file to the requestor node 105. Examples of verifying content include, but are not limited to, examining and/or comparing a name, size, hash value, and/or data associated with the retrieved file.

Additional processing also may be done to ensure time savings. For example, if a requested file is small, the time required to perform the sequence of steps including determining the signature for the file may exceed the time required to transfer the file directly. In general, if $T_t$ is the estimated transfer time for a file and $T_d$ is the time to perform the sequence of steps, then the intermediate node methods should only be used where $T_d < T_t$. Estimates for $T_t$ can be readily obtained by measuring the actual bit rate to a particular requestor node, in known fashion. Estimates for $T_d$ can be generated by first performing, in a preparation stage, a statistical analysis of actual signature determination times for a file size; as well as the time to generate the digital signature and compress a requested file. Thus, by knowing the size of a particular requested file, an estimate can be readily determined for $T_t$ and $T_d$ by extrapolation. Alternatively, an estimate for $T_d$ can be generated by performing the sequence of steps on a portion of a file, timing each action, and extrapolating to the entire file size.

The intermediate node methods, devices and programs may be implemented in hardware or software, or a combination of both. In some implementations, the intermediate node methods, devices and programs are implemented in computer programs executing on programmable computers each with at least one processor, a data storage system (including volatile and non-volatile memory and/or storage elements), at least one input device, and at least one output device. Program code is applied to input data to perform the functions described herein and generate output information. The output information is applied to one or more output devices.

The intermediate node methods, devices and programs may be implemented as a computer program storable on a medium that can be read by a computer system, such as an intermediate server 125, configured to provide the functions described herein. Again, while the intermediate node methods, devices and programs have been described as if executed on a separate processor, the intermediate node methods, devices and programs may be implemented as a software process executed within one or more intermediate servers 125.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The computer readable medium can also be a propagated signal. The intermediate node 220 system may also be considered to be implemented as a computer-readable storage medium, configured with a computer program, where the storage medium so configured causes a computer to operate in a specific and predefined manner to perform the functions described herein.

A number of implementations have been described. Nevertheless, it will be understood that various modifications may be made. For example, although the intermediate node methods, devices and programs have been described in the context of a wide area public network, the intermediate node methods, devices and programs can be applied to any network (including private wide area and local area networks) in which files requested from one node by another node pass through an intermediate processor that can be programmed or configured as an intermediate node 120.

Other implementations are within the scope of the following claims.

What is claimed is:

1. A method for improving performance by increasing available bandwidth in a network system that includes one or more requestor nodes, one or more provider nodes and one or more intermediate nodes, the method comprising:

determining a digital signature of a requested file stored by at least one provider node in the network system;

looking up the digital signature in an index of signatures; and forwarding a previously compressed version of the requested file that has been stored at an intermediate node when the digital signature is found in the index of signatures.

2. The method of claim 1 further comprising compressing the requested file and storing the digital signature in the index of signatures when the digital signature is not found in the index of signatures.

3. The method of claim 2 further comprising sending the compressed version of the requested file to a requester node.

4. The method in claim 2 further comprising sending the compressed version of the requested file to a requester node and storing the compressed version of the requested file at the intermediate node.

5. The method of claim 1 wherein determining the digital signature comprises applying a hashing technique to the requested file.

6. The method of claim 5 wherein applying the hashing technique comprises applying a version of the MD5 algorithm to the requested file.

7. The method of claim 5 wherein applying the hashing technique comprises applying a version of the SHA algorithm to the requested file.

8. The method of claim 1 further comprising determining whether an estimated time required to directly provide the requested file to a requester node is less than an estimated time to determine if a previously compressed version of the requested file is already stored at the intermediate node.

9. The method of claim 2 wherein determining the digital signature includes determining the digital signature at the provider node.

10. The method of claim 9 wherein looking up the digital signature includes looking up the digital signature at the provider node.

11. The method of claim 9 wherein looking up the digital signature includes looking up the digital signature at the intermediate node.

12. The method of claim 1 wherein determining the digital signature includes determining the digital at the intermediate node.

13. The method of claim 12 wherein looking up the digital signature includes looking up the digital signature at the provider node.

14. The method of claim 12 wherein looking up the digital signature includes looking up the digital signature at the intermediate node.

15. The method of claim 12 wherein the intermediate node comprises a caching server.

16. The method of claim 1 wherein looking up the digital signature includes looking up the digital signature at the provider node.

17. The method of claim 1 wherein looking up the digital signature is performed at the intermediate node.

18. The method of claim 1 further comprising receiving the index of digital signatures from a provider node.

19. The method of claim 1 further comprising receiving the index of digital signatures from an intermediate node.

20. The method of claim 1 wherein determining the digital signature is performed at the provider node.

21. The method of claim 1 wherein determining the digital signature is performed at the intermediate node.

22. An apparatus for improving the performance of a network system by increasing available bandwidth, the apparatus being configured to:

determine a digital signature of a requested file stored by at least one provider node in the network system;

look up the digital signature in an index of signatures; and forward a previously compressed version of the requested file that has been stored at an intermediate node when the digital signature is found in the index of signatures.

23. The apparatus of claim 22 wherein the apparatus is further configured to compress the requested file and store the digital signature in the index of signatures when the digital signature is not found in the index of signatures.

24. The apparatus of claim 23 further comprising an output interface for sending the previously compressed version of the requested file to a requester node.

25. The apparatus of claim 22 wherein the apparatus comprises a provider node.

26. The apparatus of claim 22 wherein the apparatus comprises an intermediate node.

27. The apparatus of claim 26 wherein the apparatus comprises a proxy server.

28. The apparatus of claim 26 wherein the apparatus comprises an IP tunnel.

29. The apparatus of claim 26 wherein the apparatus comprises a caching server.

30. A tangible computer-readable medium having embodied thereon a computer program configured to increase available storage in a network system, the medium comprising one or more code segments that, when executed, cause a computer to:

determine a digital signature of a requested file stored by at least one provider node in the network system;

look up the digital signature in an index of signatures; and forward a previously compressed version of the requested file that has been stored at an intermediate node when the digital signature is found in the index of signatures.

31. The medium of claim 30 wherein the one or more code segments are further configured to compress the requested file and store the digital signature in the index of signatures when the digital signature is not found in the index of signatures.

32. The medium of claim 31 wherein the one or more code segments are further configured to send the compressed requested version of the file to a requestor node.

33. The medium of claim 30 wherein, the medium is a component of a requestor node.

34. The medium of claim 30 wherein the medium is a component of a provider node.

35. The medium of claim 30 wherein the medium is a component of an intermediate node.

36. The medium of claim 30 wherein the medium comprises a disc.

* * * * *